(12) United States Patent
Watanabe

(10) Patent No.: US 9,653,078 B2
(45) Date of Patent: May 16, 2017

(54) RESPONSE GENERATION METHOD, RESPONSE GENERATION APPARATUS, AND RESPONSE GENERATION PROGRAM

(71) Applicant: TOYOTA JIDOSHA KABUSHIKI KAISHA, Toyota-shi (JP)

(72) Inventor: Narimasa Watanabe, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/826,280

(22) Filed: Aug. 14, 2015

(65) Prior Publication Data

US 2016/0055849 A1    Feb. 25, 2016

(30) Foreign Application Priority Data

Aug. 21, 2014 (JP) ................................. 2014-168762

(51) Int. Cl.
*G10L 15/00* (2013.01)
*G10L 15/26* (2006.01)
(Continued)

(52) U.S. Cl.
CPC .............. *G10L 15/26* (2013.01); *G10L 15/00* (2013.01); *G10L 15/08* (2013.01); *G10L 17/00* (2013.01); *G10L 17/22* (2013.01)

(58) Field of Classification Search
CPC ......... G10L 15/22; G10L 15/26; G10L 13/00; G10L 15/04; H04M 3/493; H04M 2203/556; H04M 3/2281; H04M 3/4936
(Continued)

(56) References Cited

U.S. PATENT DOCUMENTS 7,317,789 B2 * 1/2008 Comerford ........... H04M 3/493
379/88.13
7,502,737 B2 * 3/2009 Sharma ................... G10L 15/08
704/251

(Continued)

FOREIGN PATENT DOCUMENTS

EP        2 157 570 A1     2/2010
JP        2004-86001       3/2004
(Continued)

OTHER PUBLICATIONS

Nagai, et al., Life Activity Recording Support Using an Interactive Character Agent for Elderly, FIT2014, 13th Forum on Information Technology, Journal, vol. 3, Japan, The Institute of Electronics, Information and Communication Engineers and Information Processing of Japan, Aug. 19, 2014, p. 343-346. (referenced as Cited Document 1 in above Partial Translation).

(Continued)

*Primary Examiner* — Michael Colucci
(74) *Attorney, Agent, or Firm* — Oblon, McClelland, Maier & Neustadt, L.L.P.

(57) ABSTRACT

A response generation method includes a step of recognizing a voice of a user, a step of analyzing a structure of the recognized voice, a step of generating a free response sentence in response to the voice of the user based on the analyzed voice structure and outputting the generated free response sentence, a step of generating the recognized voice of the user as a repeat response sentence, and a step of outputting the generated repeat response sentence before outputting the free response sentence based on the voice structure.

5 Claims, 5 Drawing Sheets

(51) Int. Cl.
*G10L 15/08* (2006.01)
*G10L 17/00* (2013.01)
*G10L 17/22* (2013.01)

(58) Field of Classification Search
USPC .............. 704/235, 241, 244, 251, 275, 3, 9; 379/88.18; 455/411
See application file for complete search history.

(56) References Cited

U.S. PATENT DOCUMENTS

| | | | | |
|---|---|---|---|---|
| 7,552,054 | B1* | 6/2009 | Stifelman | G10L 15/22 704/270 |
| 8,583,439 | B1* | 11/2013 | Kondziela | G10L 15/22 379/189 |
| 8,606,576 | B1* | 12/2013 | Barr | G10L 15/22 379/88.01 |
| 8,738,377 | B2* | 5/2014 | Byrne | G10L 15/22 455/417 |
| 8,948,724 | B2* | 2/2015 | Kawasaki | H04L 12/585 379/419 |
| 2002/0091528 | A1* | 7/2002 | Daragosh | G10L 15/30 704/270.1 |
| 2002/0123894 | A1* | 9/2002 | Woodward | G10L 15/22 704/260 |
| 2007/0094003 | A1 | 4/2007 | Huang et al. | |
| 2009/0210411 | A1 | 8/2009 | Murata et al. | |
| 2009/0222257 | A1* | 9/2009 | Sumita | G10L 15/26 704/3 |
| 2009/0292528 | A1* | 11/2009 | Kameyama | B60Q 3/0293 704/9 |
| 2009/0313016 | A1* | 12/2009 | Cevik | G10L 15/22 704/241 |
| 2010/0023329 | A1* | 1/2010 | Onishi | G10L 15/07 704/244 |
| 2011/0060587 | A1* | 3/2011 | Phillips | G10L 15/30 704/235 |
| 2012/0008754 | A1* | 1/2012 | Mukherjee | G10L 15/22 379/88.18 |
| 2012/0253812 | A1* | 10/2012 | Kalinli | G10L 15/04 704/254 |
| 2012/0265528 | A1* | 10/2012 | Gruber | G10L 15/18 704/235 |
| 2014/0365226 | A1* | 12/2014 | Sinha | G10L 25/00 704/275 |

FOREIGN PATENT DOCUMENTS

| | | |
|---|---|---|
| JP | 2004-191407 A | 7/2004 |
| JP | 2009-3040 | 1/2009 |
| JP | 2009-193448 A | 8/2009 |
| JP | 2010-157081 | 7/2010 |

OTHER PUBLICATIONS

Miyake, et al., Back-channel Feedback Generation/Recognition on the Spoken Dialogue System Using Linguistic and Prosodic Information, The Acoustal Society of Japan, 2005, Autumn Meeting Papers, Japan, The Acoustical Society of Japan, Sep. 20, 2005, p. 191-192. (referenced as Cited Document 2 in above Partial Translation).

Shitaoka, et al. Active Listening System for a Dialogue Robot, 58th Materials from SIG-SLUD (SIG-SLUD-A903), Japan, The Japanese Society of Artificial Intelligence, Feb. 5, 2010, p. 61-66. (referenced as Cited Document 3 in above Partial Translation).

* cited by examiner

| KEYWORD | PART OF SPEECH | ADDITIONAL WORD ENDING |
|---|---|---|
| * | NOUN | KA |
| * | NOUN | NANDA |
| OISHII (DELICIOUS) | * | NOKA |
| YATTA | INTERJECTION | NE |

Fig. 5

RESPONSE GENERATION METHOD, RESPONSE GENERATION APPARATUS, AND RESPONSE GENERATION PROGRAM

INCORPORATION BY REFERENCE

This application is based upon and claims the benefit of priority from Japanese patent application No. 2014-168762, filed on Aug. 21, 2014, the disclosure of which is incorporated herein in its entirety by reference.

BACKGROUND OF THE INVENTION

1. Field of the Invention

The present invention relates to a response generation apparatus, a response generation method, and a response generation program capable of giving a response to a user.

2. Description of Related Art

A response generation apparatus including: voice recognition means for recognizing a voice of a user; structure analysis means for analyzing a structure of the voice recognized by the voice recognition means; and response output means for generating a response sentence in response to the voice of the user based on the voice structure analyzed by the structure analysis means and outputting the generated response sentence has been known (e.g., Japanese Unexamined Patent Application Publication No. 2010-157081).

SUMMARY OF THE INVENTION

However, the present inventors have found a problem that the above-described response generation apparatus requires time for performing the voice structure analysis and the response sentence generation, thus causing a response wait. This causes a possibility that a user may feel that something is wrong in a conversation.

SUMMARY OF THE INVENTION

The present invention has been made to solve the above-described problem and a main object thereof is to provide a response generation method, a response generation apparatus, and a response generation program capable of alleviating the user's feeling that something is wrong in a conversation caused by a response wait.

To achieve the above-described object, a first exemplary aspect of the present invention is a response generation method including: a step of recognizing a voice of a user; a step of analyzing a structure of the recognized voice; and a step of generating a free response sentence in response to the voice of the user based on the analyzed voice structure and outputting the generated free response sentence, in which the response generation method further includes: a step of generating the recognized voice of the user as a repeat response sentence; and a step of outputting the generated repeat response sentence before outputting the free response sentence based on the voice structure.

In this aspect, the response generation method may further include: a stet of analyzing a phoneme of the voice of the user; and a step of generating a responsive response in response to the voice of the user based on an analysis result of the phoneme, and the generated responsive response may be output before the generated repeat response sentence is output.

In this aspect, a plurality of response candidates for responding to the voice of the user may be generated based on the analyzed voice structure, among the plurality of generated response candidates, a response candidate that is identical to the generated repeat response sentence or the generated responsive response may be excluded, and a response candidate selected from among the response candidates, for which the exclusion has been performed, may be used as the free response sentence.

In this aspect, the repeat response sentence may be generated by extracting a keyword and its part of speech from the recognized voice of the user, selecting, based on additional information about correspondences among a plurality of keywords, their respective parts of speech and their respective additional word endings, the additional word ending corresponding to the extracted keyword and its part of speech, and adding the selected additional word ending to the extracted keyword.

To achieve the above-described object, another exemplary aspect of the present invention is a response generation apparatus including: voice recognition means for recognizing a voice of a user; structure analysis means for analyzing a structure of the voice recognized by the voice recognition means; and response output means for generating a free response sentence in response to the voice of the user based on the voice structure analyzed by the structure analysis means and outputting the generated free response sentence, in which the response generation apparatus further includes repetition generation means for generating the voice of the user recognized by the voice recognition means as a repeat response sentence, and the response output means outputs the repeat response sentence generated by the repetition generation means before outputting the free response sentence based on the voice structure.

To achieve the above-described object, another exemplary aspect of the present invention is a response generation program for causing a computer to execute: a process of recognizing a voice of a user; a process of analyzing a structure of the recognized voice; a process of generating a free response sentence in response to the voice of the user based on the analyzed voice structure and outputting the generated free response sentence; a process of generating the recognized voice of the user as a repeat response sentence; and a process of outputting the generated repeat response sentence before outputting the free response sentence based on the voice structure.

According to the present invention, it is possible to provide a response generation method, a response generation apparatus, and a response generation program capable of alleviating the user's feeling that something is wrong in a conversation caused by a response wait.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 5 shows an example of additional information stored in a memory.

DESCRIPTION OF THE EXEMPLARY EMBODIMENTS

First Exemplary Embodiment

Figure 1:
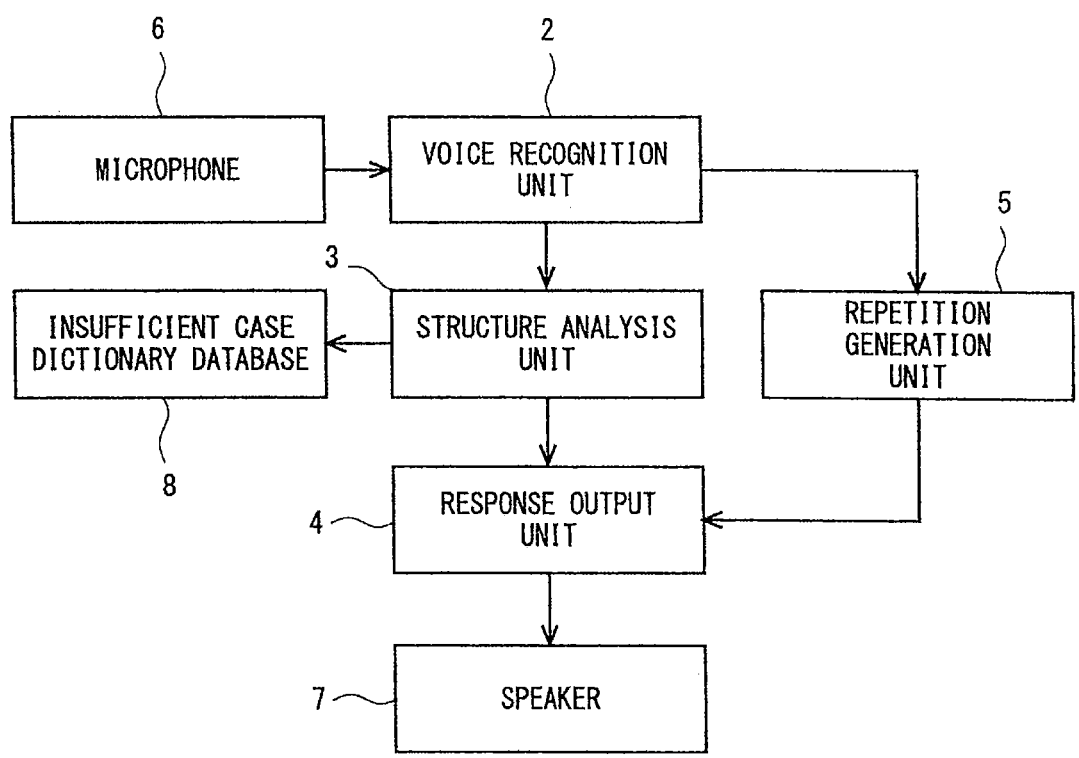
FIG. 1 is a block diagram showing a schematic system configuration of a response generation apparatus according to a first exemplary embodiment of the present invention.

Exemplary embodiments according to the present invention are explained hereinafter with reference to the drawings. FIG. 1 is a block diagram showing a schematic system configuration of a response generation apparatus according to a first exemplary embodiment of the present invention. A response generation apparatus 1 according to the first exemplary embodiment includes a voice recognition unit 2 that recognizes a voice of a user, a structure analysis unit 3 that analyzes the structure of the voice, a response output unit 4 that generates a response sentence in response to the voice of the user and outputs the generated response sentence, and a repetition generation unit 5 that generates a repeat response sentence.

Note that the response generation apparatus 1 is composed of, for example, hardware including a microcomputer as a principal component. The microcomputer includes, for example, a CPU (Central Processing Unit) that performs arithmetic processing and the like, a memory composed of a ROM (Read Only Memory) and/or a RAM (Random Access Memory) that stores an arithmetic program, a control program, and the like that are executed by the CPU, and an interface unit (I/F) through which signals are externally input/output. The CPU, the memory, and the interface unit are connected to one another through a data bus and the like.

The voice recognition unit 2 is a specific example of the voice recognition means, and performs voice recognition processing based on voice information of a user acquired through a microphone 6 and generates character-string information by converting the user's voice into text. The voice recognition unit 2 performs voice recognition by detecting a speech section from the user's voice information output from the microphone 6 and then performing, for example, pattern matching for voice information in the detected speech section by referring to a statistical language model. Note that the statistical language model is, for example, a probability model used for calculating an occurrence probability of a language expression, such as an occurrence distribution of a word and a distribution of a word that occurs after a certain word, and is obtained by learning connection probabilities on a morpheme basis. The statistical language model is stored in advance in the aforementioned memory or the like. The voice recognition unit 2 outputs the recognized user's voice information to the structure analysis unit 3 and the repetition generation unit 5.

The structure analysis unit 3 is a specific example of the structure analysis means, and analyzes the voice information recognized by the voice recognition unit 2. For example, the structure analysis unit 3 performs a morpheme analysis or the like for character-string information indicating user's voice information recognized by using an ordinary morpheme analyzer and performs a semantic analysis for the character-string information. The structure analysis unit 3 outputs the analysis result of the character-string information to the response output unit 4.

The response output unit 4 is a specific example of response output means, and generates a response sentence (hereinafter referred to as "free response sentence") for the user's voice information based on the structure of the voice information analyzed by the structure analysis unit 3 and outputs the generated free response sentence. For example, the response output unit 4 generates a free response sentence for the user's voice information based on the analysis result of the character-string information output from the structure analysis unit 3. Then, the response output unit 4 outputs the generated response sentence through a speaker 7.

More specifically, for character-string information "tonkatsu wo taberu (to eat pork cutlet)", the structure analysis unit 3 extracts a predicate argument structure and specifies a predicate "taberu (to eat)" and a case particle "wo". Then, the response output unit 4 extracts a type of case particles that can be connected to the predicate "taberu (to eat)" specified by the structure analysis unit 3 from an insufficient case dictionary database 8 in which correspondence relations between predicates and case particles are memorized. Note that the insufficient case dictionary database 8 is, for example, constructed in the aforementioned memory.

The response output unit 4 generates, for example, predicate argument structures "nani wo taberu (to eat what)", "doko de taberu (to eat where)", "itsu ni taberu (to eat when)", and "dare to taberu (to eat with whom)" as free response sentences. Further, the response output unit 4 randomly selects a predicate argument structure from a group of predicate argument structures that is obtained by excluding a surface case "wo" that does not match the user's voice from the above-described generated predicate argument structures, and uses the selected predicate argument structure as a free response sentence. As described above, the response output unit 4 performs a semantic analysis for the voice information based on the structure of the voice information analyzed by the structure analysis unit 3 and generates a plurality of free response sentence candidates. Then, the response output unit 4 selects an optimal candidate from among the plurality of generated free response sentences and uses the selected optimal candidate as a free response sentence. For example, the response output unit 4 selects a predicate argument structure "dare to tabeta no? (Whom did you eat with?)" and outputs the selected predicate argument structure as a free response sentence.

It should be noted that the above-described voice information structure analysis and its response sentence generation require time (e.g., about three seconds) to perform and hence its processing cost is high. Because of this time interval, a response wait occurs, thus causing a possibility that a user may feel that something is wrong in a conversation.

In contrast to this, in the response generation apparatus 1 according to the first exemplary embodiment, the repetition generation unit 5 generates (i.e., reproduces) the voice of the user recognized by the voice recognition unit 2 as a repeat response sentence. Further, the response output unit 4 outputs the repeat response sentence generated by the repetition generation unit 5 before outputting the free response sentence based on the voice structure.

In this way, since the repeat response sentence is just an exact repetition of the recognized user's voice, it does not substantially require a generation time (e.g., requires about one second) and hence its processing cost is low. Therefore, it is possible to output a repeat response sentence whose processing cost is low during the response wait time before outputting the above-described free response sentence which is generated based on the voice structure and whose processing cost is high. As a result, it is possible to alleviate the user's feeling that something is wrong due to the long interval in the conversation caused by the response wait.

The repetition generation unit 5 generates (i.e., reproduces) the voice information recognized by the voice recognition unit 2 as a repeat response sentence that is used to perform so-called "parroting" (i.e., exact repeating of user's voice like a parrot). The repetition generation unit 5 outputs the generated repeat response sentence to the response output unit 4. Then, the response output unit 4 outputs the repeat response sentence, which is output from the repetition generation unit 5, through the speaker 7 before outputting the free response sentence, which is generated based on the analysis result of the character-string information output from the structure analysis unit 3. As described above, a plurality of response sentences whose processing costs differ from each other are generated in parallel. Further, the generated response sentences are output in an order according to the order of their generation. This makes it possible to maintain the continuity of the conversation and thereby achieve a conversation with an unimpaired tempo.

Figure 2:
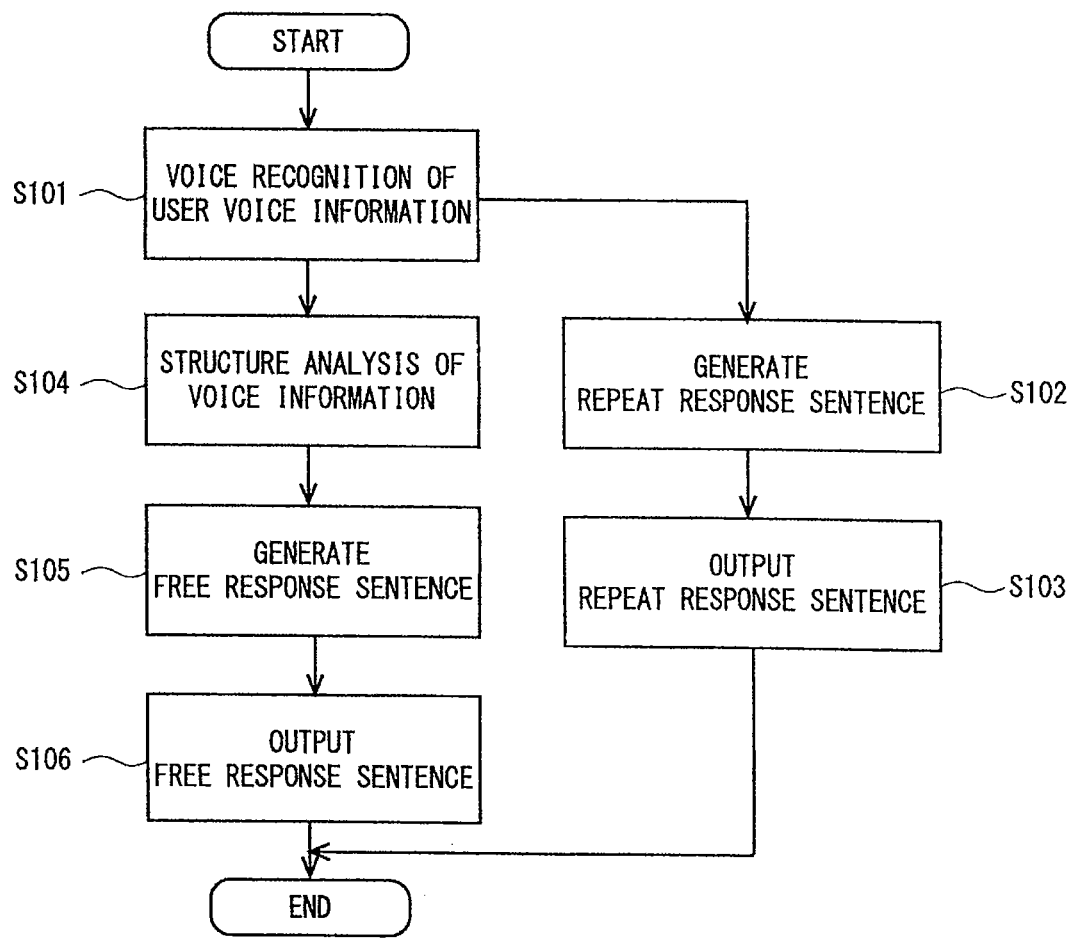
FIG. 2 is a flowchart showing a process flow of a response generation method according to the first exemplary embodiment of the present invention.

FIG. 2 is a flowchart showing a process flow of a response generation method according to the first exemplary embodiment.

The voice recognition unit 2 performs voice recognition for voice information of a user acquired through the microphone 6 (step S101) and outputs the recognized voice information of the user to the structure analysis unit 3 and the repetition generation unit 5.

The repetition generation unit 5 generates (i.e., reproduces) the voice information recognized by the voice recognition unit 2 as a repeat response sentence (step S102) and outputs the generated repeat response sentence to the response output unit 4.

The response output unit 4 outputs the repeat response sentence, which is output from the repetition generation unit 5, through the speaker 7 (step S103).

In parallel with the above-described processes in (step S102) and (step S103), the structure analysis unit 3 analyzes the structure of the voice information recognized by the voice recognition unit 2 (step S104) and outputs the analysis result of its character-string information to the response output unit 4.

The response output unit 4 generates a free response sentence based on the analysis result of the character-string information output from the structure analysis unit 3 (step S105) and outputs the generated free response sentence through the speaker 7 (step S106), As described above, in the first exemplary embodiment, the recognized user's voice is generated (i.e., reproduced) as a repeat response sentence and the generated repeat response sentence is output before outputting the free response sentence based on the voice structure. As a result, it is possible to output a repeat response sentence whose processing cost is low during the response wait time before outputting the free response sentence which is generated based on the voice structure and whose processing cost is high. Therefore, it is possible to alleviate the user's feeling that something is wrong due to the long interval in the conversation caused by the response wait.

Second Exemplary Embodiment

Figure 3:
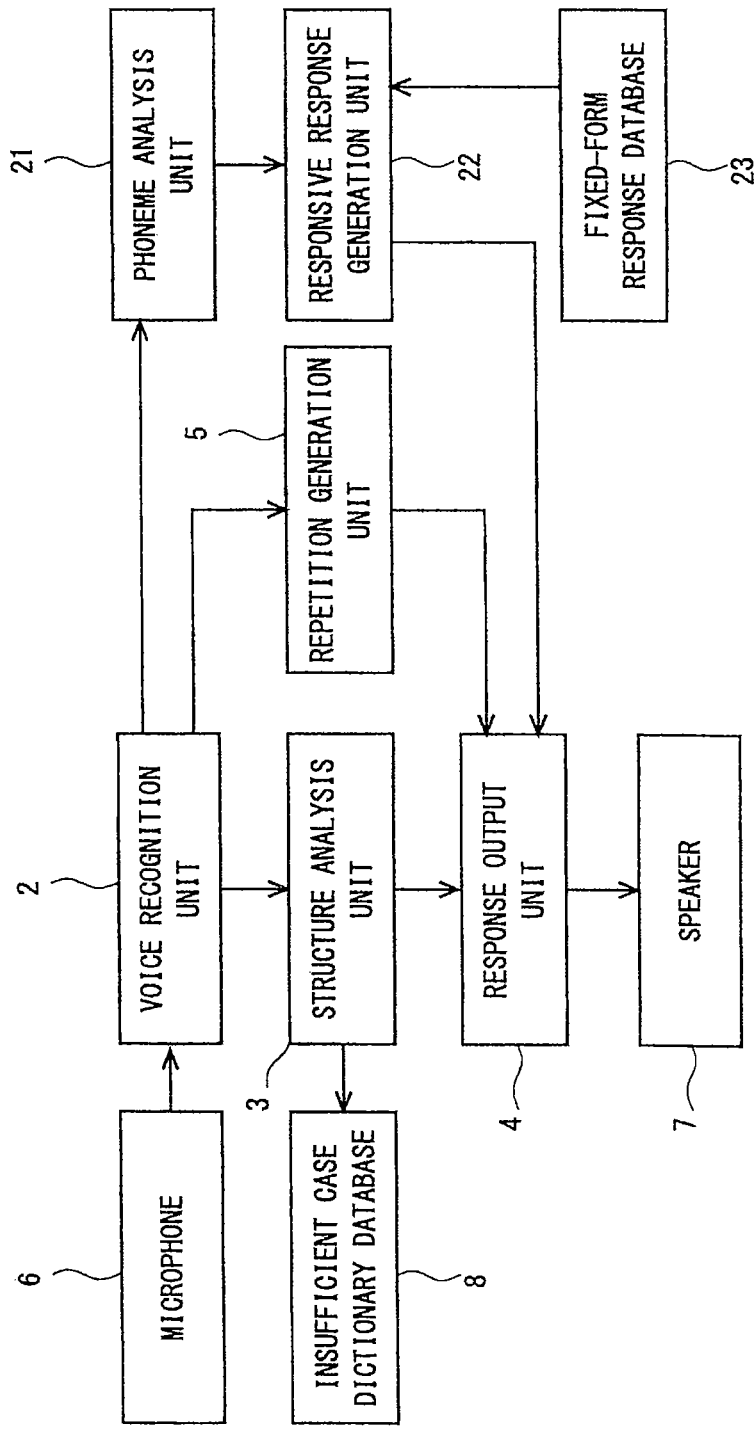
FIG. 3 is a block diagram showing a schematic system configuration of a response generation apparatus according to a second exemplary embodiment of the present invention.

FIG. 3 is a block diagram showing a schematic system configuration of a response generation apparatus according to a second exemplary embodiment of the present invention. A response generation apparatus 20 according to the second exemplary embodiment further includes, in addition to the configuration of the response generation apparatus 1 according to the above-described first exemplary embodiment, a phoneme analysis unit 21 that analyzes the phoneme of voice information of a user and a responsive-response generation unit 22 that generates a responsive response (i.e., responsive sound to express understanding and/or agreement, such as an "uh-huh" sound) to the voice information of the user.

The phoneme analysis unit 21 is a specific example of the phoneme analysis means, and analyzes the phoneme of voice information of a user based on the voice information of the user acquired through the microphone 6. For example, the phoneme analysis unit 21 infers a break in user's voice by detecting a change in the volume level and/or the frequency (such as the basic frequency) of the voice information. The phoneme analysis unit 21 outputs the phoneme analysis result to the responsive-response generation unit 22.

The responsive-response generation unit 22 is a specific example of the responsive-response generation means, and generates a responsive response to the user's voice based on the phoneme analysis result output from the phoneme analysis unit 21. For example, the responsive-response generation unit 22 searches a fixed-form response database 23 in which responsive response patterns are stored when the volume level of the voice information is lowered to or below a threshold. Then, the responsive-response generation unit 22 randomly selects a responsive response from the fixed-form response database 23. In the fixed-form response database 23, a plurality of patterns used for responsive responses, such as "un, un. (Yeah.)", "naruhodo. (I see.)", and "hoon. (Hmm.)" are stored. The fixed-form response database 23 is constructed in the aforementioned memory or the like. The responsive-response generation unit 22 outputs the generated responsive response to the response output unit 4.

The response output unit 4 outputs the responsive response generated by the responsive-response generation unit 22 through the speaker 7 before outputting the repeat response sentence generated by the repetition generation unit 5.

The phoneme analysis unit 21 can detect a change in the volume level in real time. Further, the amount of the frequency calculation that is performed when the phoneme analysis unit 21 detects a change in the frequency is smaller than that of the pattern matching. Therefore, the processing delay is smaller than that of the pattern matching. As described above, the phoneme analysis unit 21 performs a phoneme analysis by using a feature value whose processing cost is low. Therefore, the time required for generating a responsive response is shorter (e.g., about 300 msec) than the time required for the above-described repeat response sentence, and its processing cost is lower than that for the repeat response sentence.

Therefore, it is possible to output a responsive response whose processing cost is lower than the above-described repeat response sentence during the interval before outputting the above-described repeat response sentence. As a result, connections between dialogues become smoother, thus making it possible to alleviate the user's feeling that something is wrong even further. Further, a larger number of responses and response sentences whose processing costs are different from each other are generated in parallel, and the generated responses and response sentences are output in an order according to the order of their generation. This makes it possible to maintain the continuity of the conversation more smoothly and thereby achieve a more natural conversation with an unimpaired tempo.

Note that the responsive-response generation unit 22 generates a responsive response in a fixed-form manner and the repetition generation unit 5 generates a repeat response sentence by just performing superficial interpretation of a voice recognition result. Therefore, it is presumed that the response output unit 4 generates free response candidates similar to the responsive response generated by the responsive-response generation unit 22 and the repeat response generated by the repetition generation unit 5.

To cope with this, the response output unit 4 excludes, from the free response candidates, those that are identical to the responsive response generated by the responsive-response generation unit 22 or the repeat response generated by the repetition generation unit 5. Then, the response output unit 4 selects an optimal candidate from among the free response candidates, which are obtained by performing the above-described exclusion process, and uses the selected optimal candidate as a free response sentence. In this way, redundant wasteful phrases can be eliminated, thus making it possible to achieve a more natural conversation.

For example, for user's speech "kyou ha atsui ne (It is hot today)", the responsive-response generation unit 22 generates a responsive response "un (yeah)". Subsequently, the repetition generation unit 5 generates a repeat response sentence "atsui ne (It is hot)". Meanwhile, the response output unit 4 generates free response candidates such as "iyada ne (It is uncomfortable)", "itsu made atsui no kana? (How long does the heat continue?)", "atsui ne (It is hot)", and "souda ne (That's true). The response output unit 4 excludes, from the generated free response candidates, the phrase "atsui ne (It is hot)" that is identical to the repeat response sentence generated by the repetition generation unit 5. Then, the response output unit 4 selects, for example, "itsu made atsui no kana? (How long does the heat continue?)" from among the free response candidates, which are obtained by performing the above-described exclusion process, and uses the selected candidate as a free response sentence.

An example of a conversation that is generated as descried above is shown below. Note that in the below-shown example, M represents a response sentence or a response by the response generation apparatus 20 and U represents user's speech.
U: "kyou ha atsui ne. (It is hot today.)"
M (responsive response): "Un. (Yeah.)"
M (repeat response sentence): "Atsui ne. (It is hot.)"
M (free response sentence): "Itsu made atsui no kana? (How long does the heat continue?)"

As described above, it is possible to maintain the continuity of the conversation more smoothly and eliminate redundant wasteful phrases, thus making it possible to achieve a more natural conversation.

In the response generation apparatus 20 according to the second exemplary embodiment, the same symbols as those in the response generation apparatus 1 according to the above-described first exemplary embodiment are assigned to the same components/structures as those in the response generation apparatus 1, and their detailed explanations are omitted.

Figure 4:
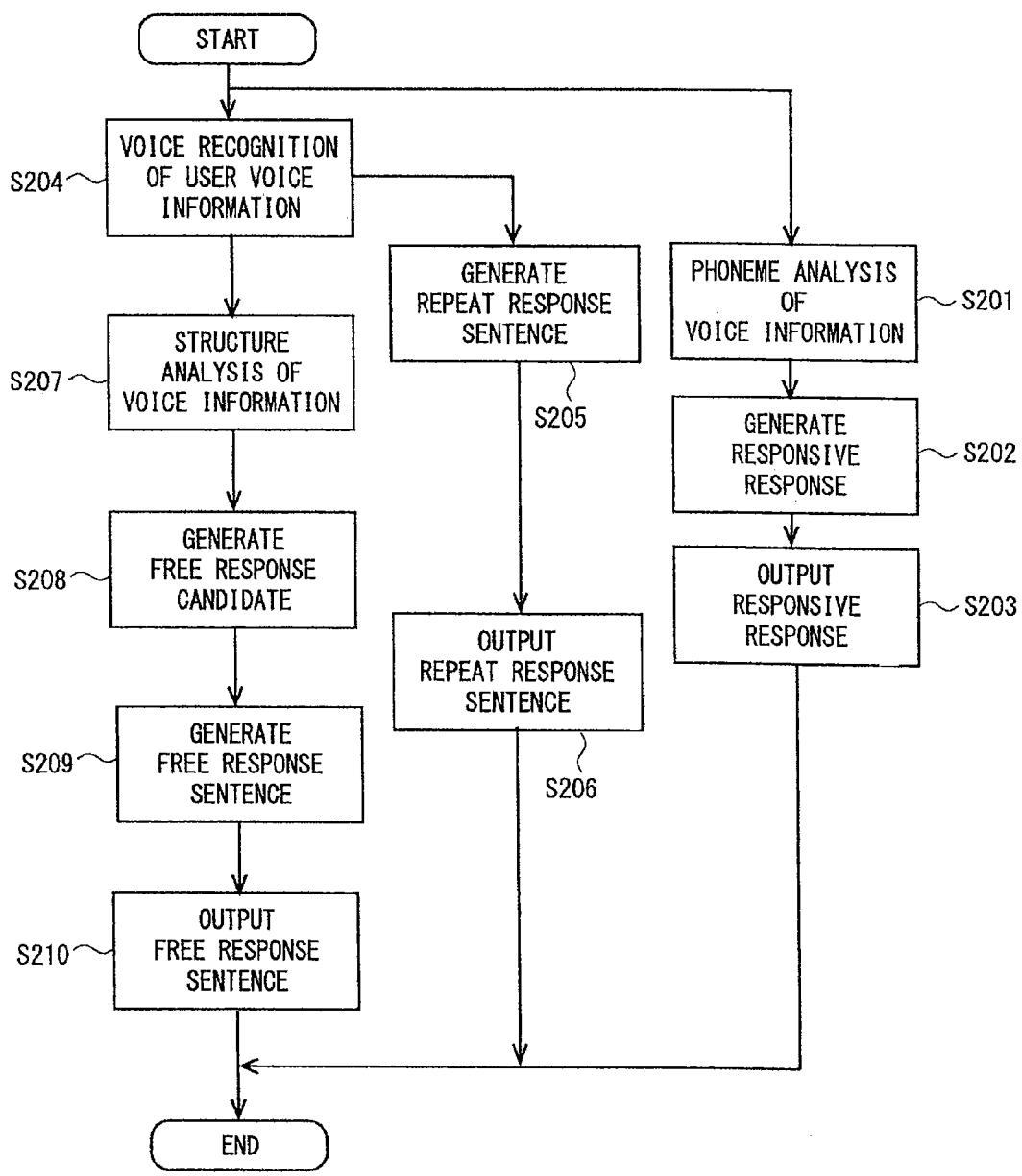
FIG. 4 is a flowchart showing a process flow of a response generation method according to the second exemplary embodiment of the present invention.

FIG. 4 is a flowchart showing a process flow of a response generation method according to the second exemplary embodiment.

The phoneme analysis unit 21 analyzes the phoneme of voice information of a user based on the voice information of the user acquired through the microphone 6 (step S201) and outputs the analysis result of the phoneme to the responsive-response generation unit 22.

The responsive-response generation unit 22 generates a responsive response to the user's voice based on the phoneme analysis result output from the phoneme analysis unit 21 (step S202) and outputs the generated responsive response to the response output unit 4.

The response output unit 4 outputs the responsive response, which is output from the responsive-response generation unit 22, through the speaker 7 (step S203).

In parallel with the above-described processed in (step S201) to (step S203), the voice recognition unit 2 performs voice recognition for the voice information of the user acquired through the microphone 6 (step S204) and outputs the recognized voice information of the user to the structure analysis unit 3 and the repetition generation unit 5.

The repetition generation unit 5 generates (i.e., reproduces) the voice information recognized by the voice recognition unit 2 as a repeat response sentence (step S205) and outputs the generated repeat response sentence to the response output unit 4.

The response output unit 4 outputs the repeat response sentence, which is output from the repetition generation unit 5, through the speaker 7 (step S206).

In parallel with the above-described processed in (step S205) and (step S206), the structure analysis unit 3 analyzes the structure of the voice information recognized by the voice recognition unit 2 (step S207) and outputs the analysis result of its character-string information to the response output unit 4.

The response output unit 4 generates a plurality of free response candidates based on the analysis result of the character-string information output from the structure analysis unit 3 (step S208). The response output unit 4 excludes, from the free response candidates, those that are identical to the responsive response generated by the responsive-response generation unit 22 or the repeat response generated by the repetition generation unit 5. Then, the response output unit 4 selects an optimal candidate from among the free response candidates, which are obtained by performing the above-described exclusion process, and uses the selected optimal candidate as a free response sentence (step S209). The response output unit 4 outputs the generated free response sentence through the speaker 7 (step S210).

The following is an example of a conversation between the response generation apparatus 20 and a user.
M (topic raising): "Ohiru nani wo tabeta no? (What did you eat for lunch?)"
U: "Tonkatsu wo tabeta yo. (I ate pork cutlet.)"
M (responsive response): "un, un. (Yeah.)"
M (repeat response sentence): "Tonkatsu wo tabeta. (I (You) ate pork cutlet.)"
M (free response sentence): "Dare to tabeta no kana? (Whom did you eat with?)"
U: "Tomodachi to tabeta yo. (I ate with a friend.)"
M (responsive response): "Sounanda. (Uh-huh.)"
M (repeat response sentence): "Tomodachi to tabeta. (I ate with a friend.)"
M (free response sentence): "Doko de tabeta no kana? (Where did you eat?)"
U: "Yabaton de tabeta yo. (I ate in Yabaton.)"
M (responsive response): "Naruhodo. (I see.)"
M (repeat response sentence): "Yabaton de tabeta. (I ate in Yabaton.)"
M (free response sentence): "Tabeta ne. (You ate)"
U: "Oisshikatta yo. (It was delicious,)"
M (responsive response): "Hoon. (Hmm.)"
M (repeat response sentence): "Oisshi katta. (It was delicious.)"

M (free response sentence): "Sore wa ii ne, xxx san. (That was good, Mr./Ms. xxx.)".

As shown in the above-shown conversation example, it can be understood that when the user speaks, a responsive response, a repeat response sentence, and a free response sentence by the response generation apparatus 20 are continuously output at an excellent tempo in response to the user's speech, thus making connections between dialogues smoother.

As described above, in the second exemplary embodiment, the phoneme of voice information of a user is analyzed and a responsive response to the voice information of the user is generated based on the analysis result. Further, the generated responsive response is output before a repeat response sentence is output. In this way, it is possible to output a responsive response whose processing cost is lower than a repeat response sentence during the interval before outputting the repeat response sentence. As a result, connections between dialogues become smoother, thus making it possible to alleviate the user's feeling that something is wrong even further.

Third Exemplary Embodiment

The repetition generation unit 5 according to a third exemplary embodiment generates a repeat response sentence by extracting a keyword from voice information of a user recognized by the voice recognition unit 2 and adding a specific additional word ending to the extracted keyword.

The repetition generation unit 5 generates (i.e., reproduces) voice information recognized by the voice recognition unit 2 as a repeat response sentence that is used to perform the parroting (i.e., exact repeating of user's voice like a parrot). Note that by performing the parroting with a specific word ending added to the voice information of the user, rather than performing the parroting without changing the user's voice at all, the naturalness of the conversation is improved. For example, for a user's speech "Umi ni itta yo (I went to the sea), the naturalness of the conversation is improved by replying to the user's speech by outputting a repeat response sentence "Umi ka (The sea)" rather than by outputting a repeat response sentence "Umi ni itta yo (I went to the sea)".

For example, additional information about correspondences among a plurality of keywords, their respective parts of speech, and additional word endings is stored in a memory. The repetition generation unit 5 extracts a keyword and its part of speech from user's voice information recognized by the voice recognition unit 2. The repetition generation unit 5 selects an additional word ending corresponding to the extracted keyword and its part of speech based on the additional information stored in the memory. The repetition generation unit 5 adds the selected additional word ending to the extracted keyword and thereby generates a repeat response sentence.

More specifically, the repetition generation unit 5 extracts, from the character-string information "tonkatsu wo tabeta yo (I ate pork cutlet)" of the voice recognized by the voice recognition unit 2, a keyword "tonkatsu (pork cutlet)" and its part of speech "noun", a keyword "wo" and its part of speech "postpositional particle", a keyword "tabeta (ate)" and its part of speech "verb", and a keyword "yo" and its part of speech "postpositional particle". Further, the repetition generation unit 5 selects the keyword "tonkatsu (pork cutlet)" and the part of speech "noun" from among the extracted keywords and their parts of speech, and selects an additional word ending "ka" corresponding to the extracted keyword "tonkatsu (pork cutlet)" and its part of speech "noun" based on the additional information stored in the memory. Note that as described above, the repetition generation unit 5 arbitrarily extracts a noun keyword or an adjective keyword from the character-string information of the voice recognized by the voice recognition unit 2, and selects an additional word ending corresponding to the extracted keyword and its part of speech.

When there are a plurality of additional word endings corresponding to the extracted keyword and its part of speech, the repetition generation unit 5 may select one of them according to the pre-defined priority order. Similarly, when the repetition generation unit 5 selects, for example, a keyword "yatta" and its part of speech "interjection" from the character-string information of the voice recognized by the voice recognition unit 2, the repetition generation unit 5 selects an additional word ending "ne" corresponding to the selected keyword "yatta" and its part of speech "interjection" based on the additional information. Note that by extracting the part of speech in addition to the keyword, it is possible to differentiate the aforementioned interjection "yatta" from a verb "yatta (done)".

The voice recognition unit 2 may add, for character-string information "oishikatta" ((it was) delicious) of the recognized voice of the user, for example, its non-conjugated original tense "oishii ((it is) delicious)" and output the character-string information with the added information to the repetition generation unit 5. In this case, the repetition generation unit 5 extracts a keyword "oishii ((it is) delicious)" and its part of speech "adjective". The repetition generation unit 5 selects an additional word ending "noka" corresponding to the keyword "oishii ((it is) delicious)" and its part of speech "adjective" based on the additional information.

FIG. 5 shows an example of the additional information stored in the memory. In the additional information shown in FIG. 5, a wild card character "*" in the keyword column indicates that the additional word ending can be applied to all the keywords. Therefore, when the repetition generation unit 5 extracts a keyword "tonkatsu (pork cutlet)" and its part of speech "noun", the repetition generation unit 5 randomly selects one of the additional word endings "ka" and "nanda" by referring to the additional information.

As described above, the repetition generation unit 5 extracts the keyword "tonkatsu (pork cutlet)" and its part of speech "noun". Then, the repetition generation unit 5 randomly selects the additional word ending "ka" corresponding to the keyword "tonkatsu (pork cutlet)" and its part of speech "noun" by referring to the additional information. Finally, the repetition generation unit 5 adds the selected additional word ending "ka" to the extracted keyword "tonkatsu (pork cutlet)" and thereby generates a repeat response sentence "tonkatsu ka ((it is) pork cutlet)". Note that the repetition generation unit 5 may add, for example, the additional word ending "ka" to an expression obtained repeating the extracted keyword twice, i.e., an expression "tonkatsu, tonkatsu (pork cutlet, pork cutlet)" and thereby generates a repeat response sentence "tonkatsu, tonkatsu ka (pork cutlet, (it is) pork cutlet)". This improves the tempo of the conversation and thereby improves the naturalness of the conversation.

According to the third exemplary embodiment, the repetition generation unit 5 extracts a keyword and its part of speech from voice information of a user, selects an additional word ending corresponding to the keyword and its part of speech based on the additional information, and generates a repeat response sentence just by adding the additional word ending to the keyword. Therefore, a repeat response sentence can be generated through a simple process and hence the processing cost can be reduced. Further, since a variety of parroting processes can be performed for user's voice by adding an appropriate additional word ending to the user's voice according to user's voice information, rather than performing a simple parroting process, the naturalness of the conversation can be improved even further.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

Although the response output unit 4 outputs a responsive response, which is generated by the responsive-response generation unit 22, through the speaker 7 in the above-described exemplary embodiments, the present invention is not limited to such configurations. The response output unit 4 may perform an arbitrary response having a low processing load based on the responsive response generated by the responsive-response generation unit 22. For example, the response output unit 4 may vibrate a vibration device, turn on/off a lighting device, display an image or the like in a display device, move a hand, a foot, a head, a torso, or the like of a robot, and so on. Further, the response output unit 4 may combine these actions as appropriate and perform them in a combined manner.

Although the response output unit 4 outputs a repeat response sentence, which is generated by the repetition generation unit 5, through the speaker 7 in the above-described exemplary embodiments, the present invention is not limited to such configurations. The response output unit 4 may output an arbitrary repeat response sentence having a low processing load based on the repeat response sentence generated by the repetition generation unit 5. For example, the response output unit 4 may output a repeat response sentence by displaying an image or the like in a display device. Further, the response output unit 4 may output a repeat response sentence by combining arbitrary output means.

Further, in the present invention, the processes shown in FIGS. 2 and 4, for example, can be implemented by causing a CPU to execute a computer program.

The program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

What is claimed is:

1. A response generation method comprising:
   a step of recognizing a voice of a user by performing voice recognition processing based on the voice of the user acquired though a microphone and generating character-string information of the voice of the user;
   a step of analyzing a structure of the recognized voice for the character-string information indicating recognized voice information of the user by using a structure analysis unit; and
   a step of generating a free response sentence in response to the voice of the user based on the analyzed voice structure by using a response generation unit and outputting the generated free response sentence by using a speaker, wherein
   the response generation method further comprises:
   a step of generating a repeat response sentence by extracting a keyword and its part of speech from the character-string information of the recognized voice of the user, selecting an additional word corresponding to the extracted keyword and its part of speech based on an additional information stored in a memory, and adding the selected word to the extracted keyword;
   a step of analyzing a phoneme of the voice of the user by detecting a change in a volume level or a frequency of the voice of the user acquired through the microphone to infer a break in the voice of the user;
   a step of generating a responsive response to the voice of the user based on an analysis result of the phoneme; and
   a step of outputting the generated repeat response sentence before outputting the generated free response sentence based on the voice structure by using the speaker, and
   the generated responsive response is output before the generated repeat response sentence is output.

2. The response generation method according to claim 1, wherein
   a plurality of response candidates for responding to the voice of the user are generated based on the analyzed voice structure,
   among the plurality of generated response candidates, a response candidate that is identical to the generated repeat response sentence or the generated responsive response is excluded, and
   a response candidate selected from among the response candidates, for which the exclusion has been performed, is used as the free response sentence.

3. The response generation method according to claim 2, wherein the repeat response sentence is generated by extracting a keyword and its part of speech from the recognized voice of the user, selecting, based on additional information about correspondences among a plurality of keywords, their respective parts of speech and their respective additional word endings, the additional word ending corresponding to the extracted keyword and its part of speech, and adding the selected additional word ending to the extracted keyword.

4. A response generation apparatus comprising:
   voice recognition means for recognizing a voice of a user by performing voice recognition processing based on the voice of the user acquired though a microphone and generating character-string information of the voice of the user;
   structure analysis means for analyzing a structure of the voice recognized by the voice recognition means for the character-string information indicating recognized voice information of the user; and response output means for generating a free response sentence in response to the voice of the user based on the voice structure analyzed by the structure analysis means and outputting the generated free response sentence by using a speaker, wherein the response generation apparatus further comprises:

repetition generation means for generating a repeat response sentence by extracting a keyword and its part of speech from the character-string information of the recognized voice of the user, selecting an additional word corresponding to the extracted keyword and its part of speech based on an additional information stored in a memory, and adding the selected word to the extracted keyword;

phoneme analysis means for analyzing a phoneme of the voice of the user by detecting a change in a volume level or a frequency of the voice of the user acquired through the microphone to infer a break in the voice of the user; and responsive-response generation means for generating a responsive response to the voice of the user based on an analysis result of the phoneme, the response output means outputs the repeat response sentence generated by the repetition generation means before outputting the generated free response sentence based on the voice structure by using the speaker, and the generated responsive response is output before the generated repeat response sentence is output.

5. A non-transitory computer readable medium storing a response generation program for causing a computer to execute:

a process of recognizing a voice of a user including performing voice recognition processing based on the voice of the user acquired though a microphone and generating character-string information of the voice of the user;

a process of analyzing a structure of the recognized voice for the character-string information indicating recognized voice information of the user by using a structure analysis unit;

a process of generating a free response sentence in response to the voice of the user based on the analyzed voice structure by using a response generation unit and outputting the generated free response sentence by using a speaker;

a process of generating a repeat response sentence by extracting a keyword and its part of speech from the character-string information of the recognized voice of the user, selecting an additional word corresponding to the extracted keyword and its part of speech based on an additional information stored in a memory, and adding the selected word to the extracted keyword;

a process of analyzing a phoneme of the voice of the user by detecting a change in a volume level or a frequency of the voice of the user acquired through the microphone to infer a break in the voice of the user;

a process of generating a responsive response to the voice of the user based on an analysis result of the phoneme; and a process of outputting the generated repeat response sentence before outputting the generated free response sentence based on the voice structure by using the speaker, wherein the generated responsive response is output before the generated repeat response sentence is output.

* * * * *